United States Patent
Sokol et al.

(10) Patent No.: US 9,770,975 B2
(45) Date of Patent: Sep. 26, 2017

(54) MULTI-STAGE FRESH AIR INLET SYSTEM

(71) Applicant: GM GLOBAL TECHNOLOGY OPERATIONS LLC, Detroit, MI (US)

(72) Inventors: James M. Sokol, Commerce Township, MI (US); David A. Schoener, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 165 days.

(21) Appl. No.: 14/676,264

(22) Filed: Apr. 1, 2015

(65) Prior Publication Data

US 2016/0290215 A1    Oct. 6, 2016

(51) Int. Cl.

| | |
|---|---|
| *F01P 1/02* | (2006.01) |
| *F01P 7/02* | (2006.01) |
| *B60K 11/08* | (2006.01) |
| *F02M 35/16* | (2006.01) |
| *F02M 35/10* | (2006.01) |

(52) U.S. Cl.
CPC ............ *B60K 11/085* (2013.01); *B60K 11/08* (2013.01); *F02M 35/10013* (2013.01); *F02M 35/161* (2013.01)

(58) Field of Classification Search
CPC ............. F02M 35/04; F02M 35/10013; F02M 35/161; Y10T 29/49428; B60K 13/02; B60K 11/085; B60K 11/08
USPC ........ 123/41.7, 41.79, 41.04; 180/68.1, 68.2, 180/68.3, 68.4
See application file for complete search history.

(56) References Cited

U.S. PATENT DOCUMENTS

| | | | |
|---|---|---|---|
| 8,100,209 B2 * | 1/2012 | Goldsberry ............ | B60K 13/02 180/68.1 |
| 8,127,878 B2 * | 3/2012 | Teraguchi .............. | B60K 11/08 180/68.1 |
| 2003/0188902 A1 | 10/2003 | Deculr | |

FOREIGN PATENT DOCUMENTS

| | | |
|---|---|---|
| DE | 10257857 A1 | 7/2004 |
| JP | 2008247122 A | 10/2008 |
| WO | 2015052868 A1 | 4/2015 |

\* cited by examiner

*Primary Examiner* — Syed O Hasan
(74) *Attorney, Agent, or Firm* — Quinn IP Law

(57) ABSTRACT

A fresh air inlet system includes an inlet panel defining first windows and second windows, offset from the first windows. An inlet baffle is below the inlet panel and an outlet baffle is opposite the inlet panel from the inlet baffle. The outlet baffle at least partially defines an outlet plenum providing air-flow communication to an induction duct. A longitudinal flow section is defined between the inlet baffle and the inlet panel. A first vertical flow section is defined by the first windows and a second vertical flow section is defined by the second windows. The first vertical flow section is substantially perpendicular to the longitudinal flow section and the second vertical flow section is substantially perpendicular to the longitudinal flow section. Therefore, intake air flows successively from the longitudinal flow section to the first vertical flow section, to the second vertical flow section, and to the induction duct.

11 Claims, 4 Drawing Sheets

MULTI-STAGE FRESH AIR INLET SYSTEM

TECHNICAL FIELD

This disclosure generally relates an air induction system for a vehicle engine.

BACKGROUND

Engine air induction systems are designed to provide air for combustion with fuel in automobiles and other vehicles. Air from outside of the vehicle is drawn toward the engine.

SUMMARY

A fresh air inlet system for directing intake air to an induction duct is provided. The fresh air inlet includes an inlet panel defining a plurality of first windows and a plurality of second windows offset from the first windows. An inlet baffle is disposed below the inlet panel, and an outlet baffle is disposed opposite the inlet panel from the inlet baffle. The outlet baffle at least partially defines an outlet plenum, which provides air-flow communication between the inlet panel and the induction duct.

A longitudinal flow section is defined between the inlet baffle and the inlet panel. A first vertical flow section is defined by the first windows of the inlet panel and a transverse flow section is defined by the inlet panel intermediate the first windows and the second windows.

The first vertical flow section is substantially perpendicular to the longitudinal flow section and the transverse flow section is substantially perpendicular to both the longitudinal flow section and the first vertical flow section. Therefore, intake air flows successively from the longitudinal flow section to the first vertical flow section, from the first vertical flow section to the transverse flow section, and from the transverse flow section to the induction duct.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
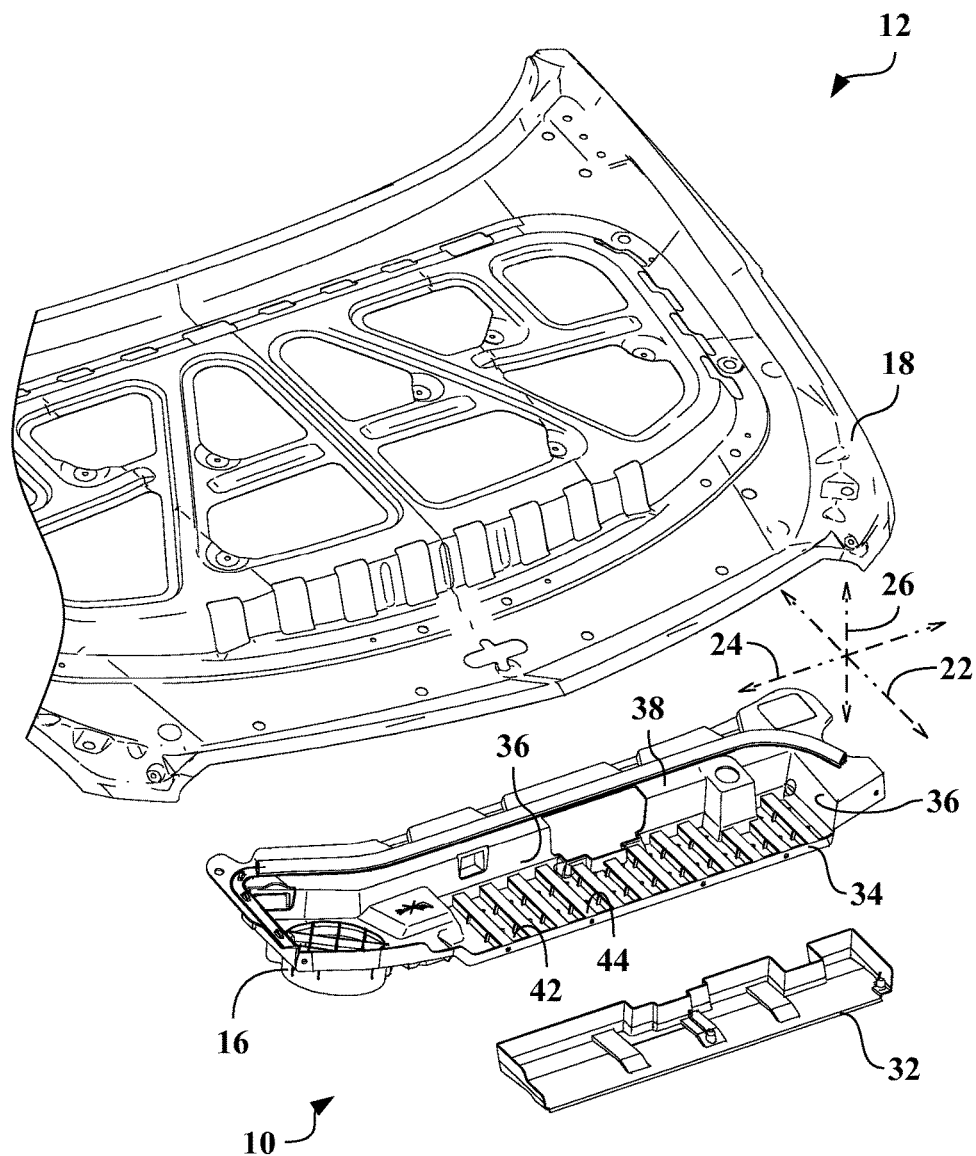
FIG. 1 is a schematic, isometric, exploded view of a portion of a vehicle and an air intake system.
Figure 2:
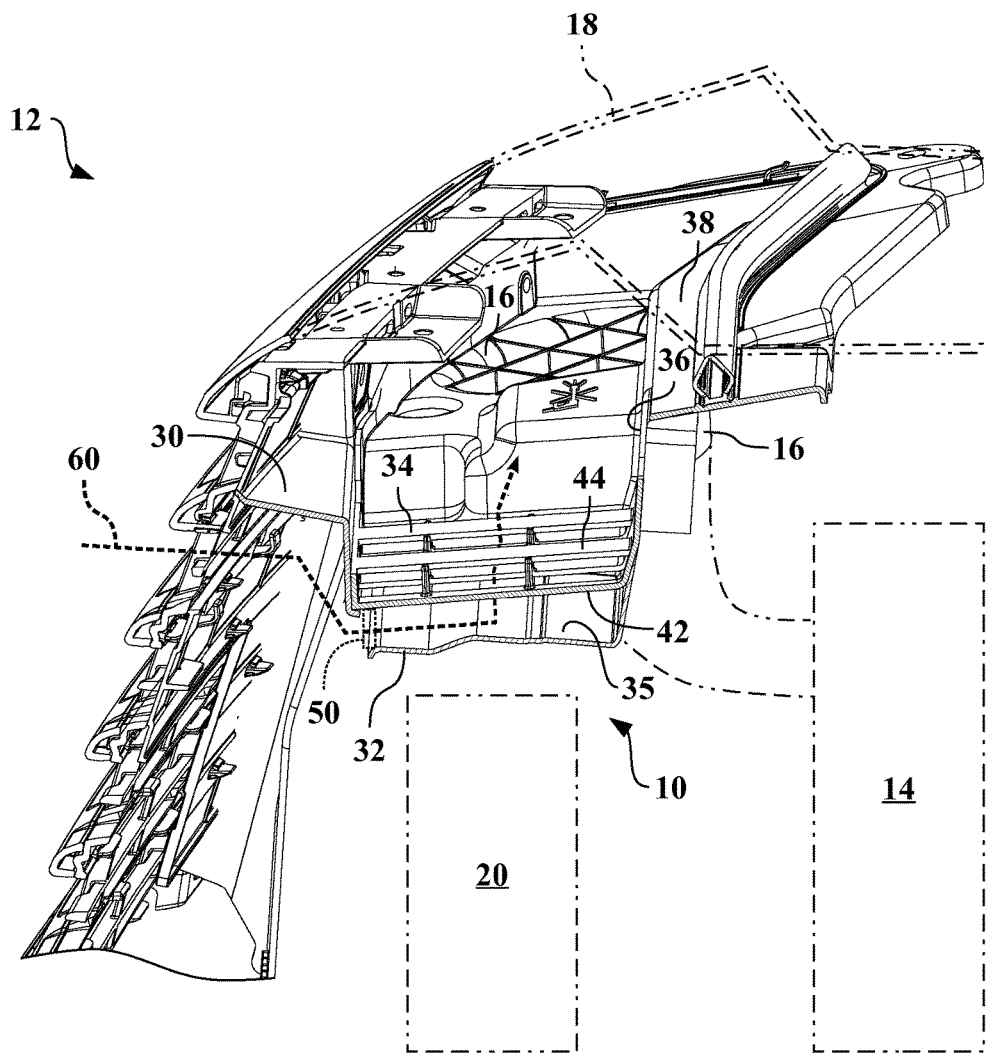
FIG. 2 is a schematic, cross-sectional view of a portion of the air intake system and vehicle of FIG. 1, illustrating relative location of an engine and a condenser, radiator, and fan module.

Referring to the drawings, wherein like reference numbers correspond to like or similar components whenever possible throughout the several figures, there is shown in FIG. 1 and FIG. 2 portions of an air intake system or fresh air inlet 10 for a vehicle 12. FIG. 1 shows an exploded view of portions of the fresh air inlet 10 relative to a closure panel 18, which is above the fresh air inlet 10. The closure panel 18 may represent a hood inner panel, hood outer panel, any closure mechanism, sight shield, or combinations thereof.

FIG. 2 shows a partial cross-sectional view of a portion of the vehicle 12 and the fresh air inlet 10. The relative location of the section view is shown as line 2-2 in FIG. 3. FIG. 2 shows the fresh air inlet 10 relative to an engine 14 (shown schematically) and an induction duct 16 in airflow communication with the engine 14. A condenser, radiator, and fan module (CRFM) 20 is also shown schematically in FIG. 2. Air passes through the CRFM 20 into the engine compartment housing the engine 14.

While the present disclosures may be described with respect to specific applications or industries, those skilled in the art will recognize the broader applicability of the disclosures. Those having ordinary skill in the art will recognize that terms such as "above," "below," "upward," "downward," et cetera, are used descriptively of the figures, and do not represent limitations on the scope of the disclosures. Any numerical designations, such as "first" or "second" are illustrative only and are not intended to limit the scope of the disclosures in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The fresh air inlet 10 and vehicle 12 are illustrated relative to a three-axis coordinate system. A longitudinal direction 22 reflects movement, position, or orientation relative to the front and back of the vehicle 12; a transverse direction 24 reflects movement, position, or orientation relative to the left and right sides of the vehicle 12; and a vertical direction 26 reflects movement, position, or orientation relative to the bottom and top (as defined by gravity or the roadway) of the vehicle 12.

Air provided by the fresh air inlet 10 is used for combustion by the engine 14. Factors such as pressure drop, inlet air temperature, air outlet temperature, noise, contaminant prevention, and moisture separation are considered in achieving an optimal design for the fresh air inlet 10. Generally, performance of the engine 14 is improved when the fresh air inlet 10 delivers the lowest temperature air with the least pressure drop between the inlet and outlet of the fresh air inlet 10. Air drawn from the engine compartment is generally at a higher temperature than air drawn from other locations, such as the front of the vehicle 12, because engine compartments have higher air temperatures than compared to outside ambient air. However, ambient air is more likely to include moisture, including rain, snow, or road splash.

In many configurations a filter, not shown, will be placed between the induction duct 16 and the engine 14. The fresh air inlet 10 improves performance of the vehicle 12 by delivering a high volume of relatively clean, dry air with little pressure drop. Air upstream from the filter, such as that passing through the fresh air inlet 10, may be referred to as dirty air, and air downstream of the filter may be referred to as clean air.

Figure 3:
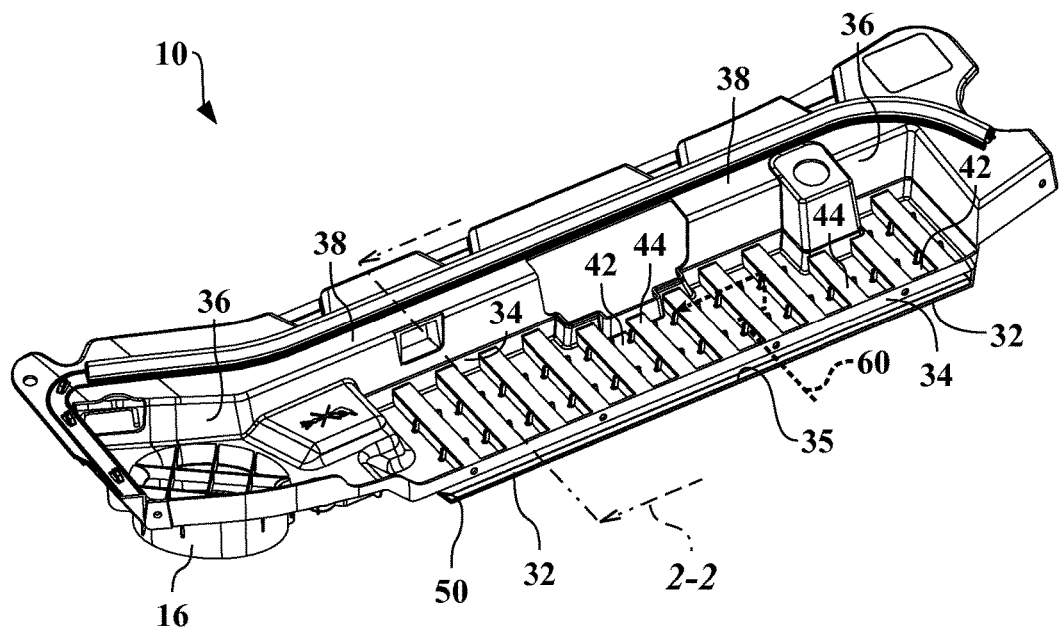
FIG. 3 is a schematic, isometric view of an inlet baffle, inlet panel, and outlet baffle for the air intake system.

FIG. 2 shows a cross-sectional view of a portion of the vehicle 12, including the fresh air inlet 10, taken generally along a line 2-2 of FIG. 3. The fresh air inlet 10 includes multiple stages, each of which alters the direction of airflow through the fresh air inlet 10. Changes in direction of airflow promote removal of moisture, such as rain and snow, as the air moves through the fresh air inlet 10 toward the induction duct.

As shown in FIGS. 1 and 2, the fresh air inlet 10 includes a front baffle 30, which redirects air coming from the front of the vehicle 12 into a first stage of the fresh air inlet 10. The first stage of the fresh air inlet 10 is formed between an inlet baffle 32 and an inlet panel 34.

The first stage occurs within an inlet plenum 35 defined between, and substantially bounded or framed by, the inlet baffle 32 and the inlet panel 34. As used herein, a plenum is a space volume that is substantially enclosed and can serve as a holding or receiving chamber for air being distributed to other areas of the vehicle 12.

A second stage of the fresh air inlet 10 is formed by the inlet panel 34, and a third stage of the fresh air inlet 10 is formed by an outlet plenum 36 defined above the inlet panel 34. The outlet plenum 36 is the space or volume providing airflow communication between the inlet panel 34 and the induction duct 16.

An outlet baffle 38 extends above the inlet panel 34. In some configurations, the outlet baffle 38 may be formed as one piece with the inlet panel 34.

The inlet baffle 32 is shown below the inlet panel 34 and the outlet baffle 38 is shown above the inlet panel 34, such that air flows from bottom to top through the inlet panel 34. However, the relative locations of the inlet baffle 32 and the outlet baffle 38 may be reversed, such that air flows from top to bottom through the inlet panel 34.

The outlet plenum 36 is a substantially enclosed volume holding air for the induction duct 16. In the configuration shown, the outlet plenum 36 is defined or bounded by the inlet panel 34, the outlet baffle 38, the front baffle 30, and the closure panel 18. However, additional seals, panels, or other structures may further define the outlet plenum 36.

Note that fresh air from the front of the vehicle 12 enters the inlet plenum 35 of the fresh air inlet 10 from above the CRFM 20, and that there is little or no airflow from near the engine 14. Therefore, heat generated by the engine 14 and heat radiated by the CRFM 20 is not passed into the fresh air inlet 10.

Figure 4:
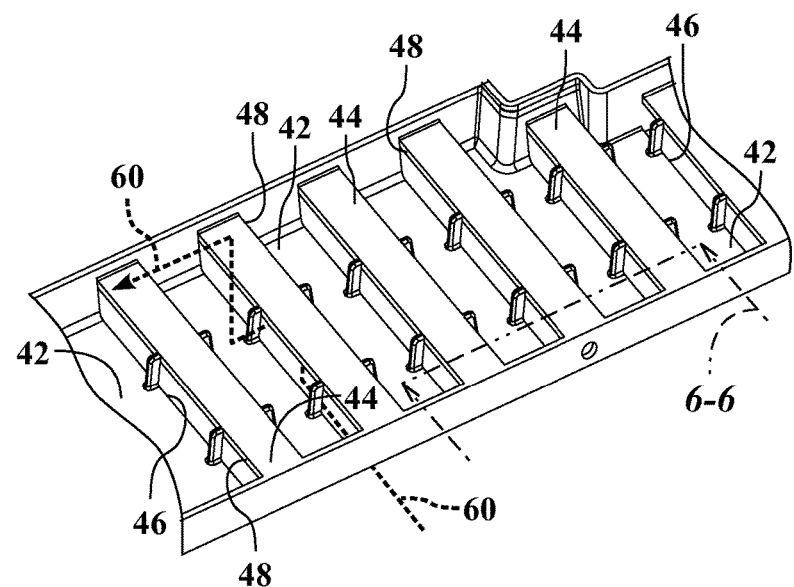
FIG. 4 is a schematic, isometric view of a portion of the inlet panel shown in FIG. 3.
Figure 5:
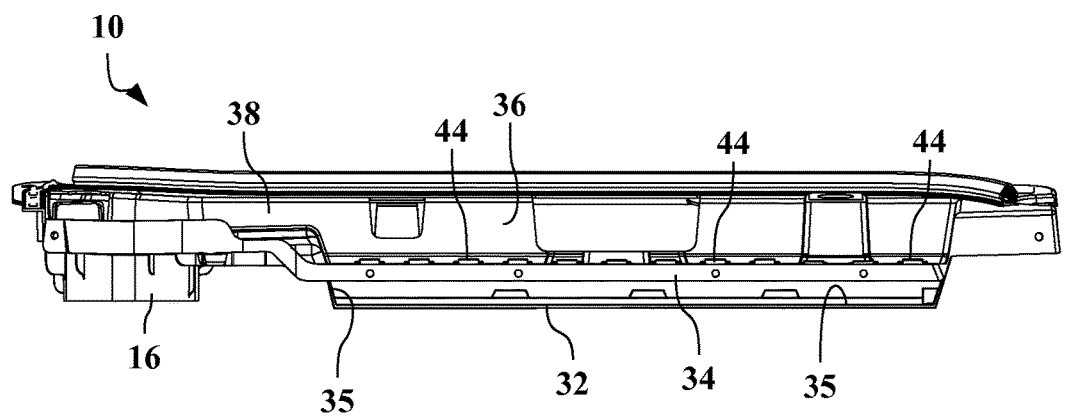
FIG. 5 is a schematic, front view of the inlet baffle, inlet panel, and outlet baffle shown in FIGS. 3-4.
Figure 6:
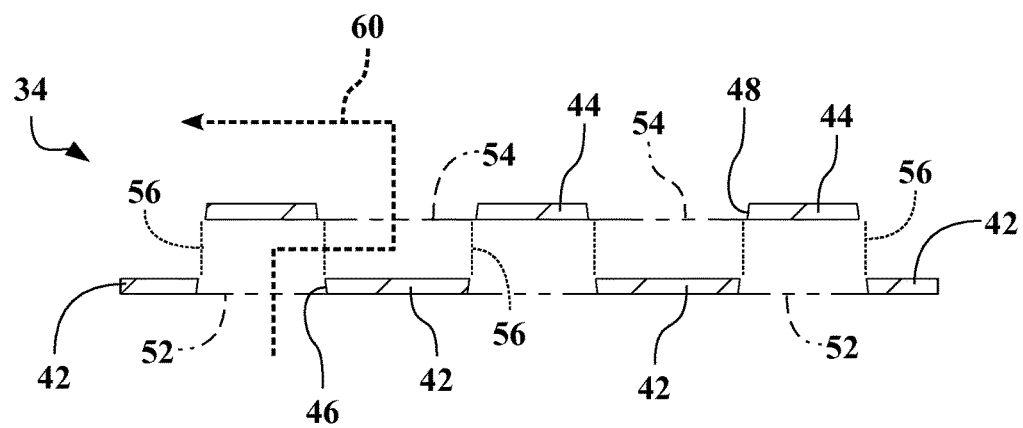
FIG. 6 is a schematic, partial cross-sectional view taken generally along line 6-6 of FIG. 4.

Referring also to FIGS. 3 and 4, and to FIGS. 5 and 6, and with continued reference to FIGS. 1-2, there are shown additional views of portions of the fresh air inlet 10. FIG. 3 shows an isometric view of the inlet baffle 32, the inlet panel 34, and the outlet baffle 38; and FIG. 4 shows a detail view of the inlet panel 34. FIG. 5 shows a front view of the inlet baffle 32, the inlet panel 34, and the outlet baffle 38; and FIG. 6 shows a partial cross-section of the inlet panel 34 taken generally along a line 6-6 of FIG. 4.

As viewed in FIGS. 3 and 4, the inlet panel 34 includes a plurality of first longitudinal keys or first keys 42 and a plurality of second longitudinal keys or second keys 44. The first keys 42 and the second keys 44 are elongated slats, strips, laths, or ribs. The second keys 44 are vertically offset from the first keys 42 and are also transversely offset relative to the first keys 42.

The first keys 42 define a plurality of first slots or first windows 46 therebetween. The second keys 44 define a plurality of second slots or second windows 48 therebetween. Each of the first windows 46 and the second windows 48 is a substantially planar opening bounded or framed by portions of the inlet panel 34. Because the first keys 42 and the second keys 44 are transversely offset, the second windows 48 are transversely offset from the first windows 46. The first windows 46 and the second windows 48 are aligned with the direction of airflow entering the front of the vehicle 12 during normal operation.

The inlet baffle 32 is below the inlet panel 34 and receives air from the front of the vehicle 12, such as through a grill. Air enters the fresh air inlet 10 moving longitudinally into the inlet baffle 32 below the inlet panel 34, possibly after redirection by the front baffle 30. At the front of the fresh air inlet 10 is a longitudinal flow section 50 defined between the inlet baffle 32 and the inlet panel 34.

As used herein, flow sections are defined and identified by the general direction of air passing through each respective flow section. For example, as air moves through the longitudinal flow section 50, it is moving substantially longitudinally (i.e., substantially parallel with the longitudinal direction 22). The flow sections are windows or areas through which air flows within the fresh air inlet 10. Each of the flow sections described herein defines a total cross-sectional area substantially perpendicular to the direction of flow.

As used herein, the term substantially denotes variance from exact or perfect values. Skilled artisans recognize that relationships, ratios, or orientations are rarely exact. Therefore, for example, substantially equal may refer to variances of five-percent from exact (one-hundred percent) equality.

The front baffle 30, when included in the fresh air inlet 10, directs air to the longitudinal flow section 50 defined between the inlet baffle 32 and the inlet panel 34. However, note that some air may flow directly into the longitudinal flow section 50, and that some configurations of the fresh air inlet 10 may simply include a wall closing off the outlet plenum 36. The longitudinal flow section 50 is bounded by the inlet baffle 32 and the inlet panel 34.

After entering the inlet baffle 32, air must turn from moving substantially longitudinally to moving substantially vertically in order to enter the inlet panel 34, which defines a second stage of the fresh air inlet 10. The first windows 46 of the inlet panel 34 define a first vertical flow section 52, which is substantially perpendicular to the longitudinal flow section 50, and the second windows 48 of the inlet panel 34 define a second vertical flow section 54, which is substantially perpendicular to the longitudinal flow section 50. The first vertical flow section 52 and the second vertical flow section 54 are substantially perpendicular to the vertical direction 26, such that air passing therethrough is moving vertically.

The first vertical flow section 52 is a composite of the first windows 46, such that the total area of the first vertical flow section 52 is substantially equal to the sum of the areas of each of the first windows 46. Similarly, the second vertical flow section 54 is a composite of the second windows 48, such that the total area of the second vertical flow section 54 is substantially equal to the sum of the areas of each of the second windows 48.

The outlet plenum 36 is a substantially enclosed volume between the second vertical flow section 54 and the induction duct 16. Intake air flows successively from the longitudinal flow section 50 to the first vertical flow section 52, then to the second vertical flow section 54, and then to the induction duct 16. In some configurations of the fresh air inlet 10, the second vertical flow section 54 is substantially parallel to the first vertical flow section 52.

A transverse flow section 56 may be defined by the inlet panel 34 intermediate the first windows 46 and the second windows 48. Therefore, air passes through the transverse flow section 56 between the first vertical flow section 52 and the second vertical flow section 54. The transverse flow section 56 is defined by the vertical offset between the first keys 42 and the second keys 44, and is substantially perpendicular to the longitudinal flow section 50 and to the first vertical flow section 52. The transverse flow section 56 is a composite area of the windows between the edges of the first keys 42 and the second keys 44, and is also a composite of the space between the edges of the first windows 46 and the second windows 48.

The first vertical flow section 52 is the combined area of the first windows 46 and the second vertical flow section 54 is the combined area of the second windows 48. Similarly, the transverse flow section 56 is defined by the combined area of the individual vertical offset areas between the first keys 42 and the second keys 44.

During operation of the fresh air inlet 10, air enters the front of the vehicle 12, passes through the longitudinal flow section 50, and moves into the inlet baffle 32, as illustrated by an exemplary flow path 60. In the inlet baffle 32, air is moving substantially longitudinally, but needs to make a right-angle turn in order to enter the inlet panel 34. This change of direction causes separation of moisture, such as rain and snow, from the air. The momentum of the moisture continues longitudinally as the air moves vertically toward the inlet panel 34.

Air moves substantially vertically through the first vertical flow section 52 between the first keys 42. The second keys 44 force the air to make another right-angle turn (toward either the left or right side of the vehicle 12) and to pass through the transverse flow section 56. The airflow is then forced to make another right-angle turn to pass through the second vertical flow section 54.

Therefore, the inlet panel 34, as the second stage of the fresh air inlet 10, causes airflow to make at least two right-angle turns, each of which promotes additional separation of moisture from the air. As the airflow leaves the inlet panel 34 and enters the outlet plenum 36, as the third stage, it makes either another right-angle turn or a one-hundred-eighty degree turn toward the induction duct 16. The outlet plenum 36 includes or defines another transverse flow section through which air passes before leaving the fresh air inlet 10.

Moisture removed by each change of direction falls downward and drains through the inlet panel 34, which effectively has a drain grate formed by the first windows 46 and the second windows 48. Additionally, the fresh air inlet 10—particularly the inlet plenum 35 and the outlet plenum 36—reduces the velocity of airflow passing between the longitudinal flow section 50 and the induction duct 16. Generally, lower velocities are beneficial for dropping moisture of the airstream.

Each of the flow sections defined by the fresh air inlet 10 are described or named relative to the three-axis system (i.e., the longitudinal direction 22, the transverse direction 24, and the vertical direction 26). However, the relative changes of direction of airflow moving between the flow sections apply even if they are tilted off of the respective axes.

Alternatively stated, each stage of the multi-stage fresh air inlet 10 causes at least one change of direction that promotes separation of moisture from the airflow. In the first stage, formed by the inlet baffle 32, the air is changed from substantially longitudinal flow to substantially vertical flow. In the second stage, formed by the inlet panel 34, the air is changed from substantially vertical flow to substantially transverse flow, and back to substantially vertical flow. In the third stage, formed by the outlet baffle 38, the air is changed from substantially vertical flow to substantially transverse flow as it moves toward the induction duct 16. Depending on the orientation of the induction duct 16, an additional change of direction may occur.

The longitudinal flow section 50 is front facing relative to the vehicle 12. The front-facing orientation results in increased pressure of the air entering or filling the inlet plenum 35, even receiving ram air while the vehicle 12 is moving at speed. Increased pressure, relative to ambient pressure, reduces vacuum relative to the engine compartment. Other systems may have a higher vacuum that could result in pulling hot air from the engine compartment into the induction duct.

However, the front-facing orientation may also result in an increased likelihood of moisture being pulled into the fresh air inlet 10, such that the changes of direction caused by the offset flow sections are used to remove moisture from the air flow prior to the induction duct 16. Noise, vibration, and harshness is also reduced by the multiple stages, as there is no direct path between the induction duct 16 and the exterior of the vehicle 12 and multiple pre-plenums are formed by the stages of the fresh air inlet 10.

In order to reduce the constriction of airflow, and to minimize pressure drop, the fresh air inlet 10 maintains relatively high volumetric flow at low velocity. Furthermore, the total area of each of the flow sections is larger than the cross-sectional area of the induction duct 16. In the configuration shown in the figures, for example, the total area of each of the longitudinal flow section 50, the first vertical flow section 52, the second vertical flow section 54, and the transverse flow section 56 is at least one hundred and fifty percent of the cross-sectional area of the induction duct 16. In some configurations, the area of one or more of the flow sections may be up to five hundred percent of the cross-sectional area of the induction duct 16.

In an alternative embodiment, not shown, the inlet panel 34 may include transverse keys or slats. In such an embodiment, first and second vertical flow sections may be longitudinally offset and a second longitudinal flow section would be defined between the transverse keys. Note that this embodiment may result in at least one less change of direction of airflow, as the transverse keys would be aligned toward the induction duct 16. Air could immediately begin sweeping transversely toward the induction duct 16 before vertically clearing the second transverse keys.

The detailed description and the drawings or figures are supportive and descriptive of the subject matter discussed herein. While some of the best modes and other embodiments have been described in detail, various alternative designs, configurations, and embodiments exist.

The invention claimed is:

1. A fresh air inlet system for directing intake air to an induction duct, comprising: an inlet panel having a plurality of first longitudinal keys defining a plurality of first windows and a plurality of second longitudinal keys defining a plurality of second windows offset from the first windows, wherein the first longitudinal keys and the second longitudinal keys are stacked and the second windows are transversely offset from the first windows; an inlet baffle adjacent to the inlet panel; an outlet baffle opposite the inlet panel from the inlet baffle, wherein the outlet baffle at least partially defines an outlet plenum providing air-flow communication between the inlet panel and the induction duct; a longitudinal flow section defined between the inlet baffle and the inlet panel; a first vertical flow section defined by the first windows of the inlet panel, wherein the first vertical flow section is substantially perpendicular to the longitudinal flow section; and a second vertical flow section defined by the second windows of the inlet panel, wherein the second vertical flow section is substantially perpendicular to the longitudinal flow section, such that intake air flows successively from the longitudinal flow section to the first vertical flow section, to the second vertical flow section, to the induction duct.

2. The fresh air inlet system of claim 1, further comprising:
a transverse flow section defined by the inlet panel intermediate the first windows and the second windows, wherein the transverse flow section is substantially perpendicular to the longitudinal flow section and substantially perpendicular to the first vertical flow section, such that intake air flows successively from the longitudinal flow section to the first vertical flow section, to the transverse flow section, to the second vertical flow section, to the induction duct.

3. The fresh air inlet system of claim 2, wherein the total area of the longitudinal flow section, the total area of first vertical flow section, the total area of the second vertical flow section, and the total area of the transverse flow section is at least one hundred and fifty percent of the cross-sectional area of the induction duct.

4. The fresh air inlet system of claim 3,
wherein the second vertical flow section is substantially parallel to the first vertical flow section.

5. The fresh air inlet system of claim 4, wherein the transverse flow section is defined between the first longitudinal keys and the second longitudinal keys.

6. The fresh air inlet system of claim 5, further comprising:
a front baffle forward of the inlet panel, wherein the front baffle directs air to the longitudinal flow section;
a closure panel above the outlet baffle; and
wherein the outlet plenum defined by the inlet panel, the outlet baffle, the front baffle, and the closure panel, and wherein the outlet plenum is substantially enclosed between the second vertical flow section and the induction duct.

7. The fresh air inlet system of claim 6, further comprising:
a condenser, radiator, and fan module (CRFM),
wherein the inlet baffle is above the CRFM, such that the longitudinal flow section receives air from above the CRFM.

8. A fresh air inlet system for a vehicle, comprising: an engine; an induction duct in airflow communication with the engine; a condenser, radiator, and fan module (CRFM) forward of the engine; an inlet panel having a plurality of first longitudinal keys defining a plurality of first windows and a plurality of second longitudinal keys defining a plurality of second windows that are transversely offset from the first windows, wherein the first longitudinal keys and the second longitudinal keys are stacked; an outlet baffle above the inlet panel, wherein the outlet baffle at least partially defines an outlet plenum providing air-flow communication between the inlet panel and the induction duct; an inlet baffle below the inlet panel and above the CRFM; a longitudinal flow section defined between the inlet baffle and the inlet panel; a first vertical flow section defined by the first windows of the inlet panel, wherein the first vertical flow section is substantially perpendicular to the longitudinal flow section; a second vertical flow section defined by the second windows of the inlet panel, wherein the second vertical flow section is substantially perpendicular to the longitudinal flow section, such that intake air flows successively from the longitudinal flow section to the first vertical flow section, to the second vertical flow section, to the induction duct; and a transverse flow section defined by the inlet panel intermediate the first windows and the second windows, such that the transverse flow section is between the first longitudinal keys and the second longitudinal keys, and wherein the transverse flow section is substantially perpendicular to the longitudinal flow section and substantially perpendicular to the first vertical flow section, such that intake air flows successively from the longitudinal flow section to the first vertical flow section, to the transverse flow section, to the second vertical flow section, to the induction duct.

9. The fresh air inlet system of claim 8, wherein the longitudinal flow section faces the front of the vehicle.

10. The fresh air inlet system of claim 9, wherein the total area of the longitudinal flow section, the total area of first vertical flow section, the total area of the second vertical flow section, and the total area of the transverse flow section is at least one hundred and fifty percent of the cross-sectional area of the induction duct.

11. The fresh air inlet system of claim 10, wherein the longitudinal flow section is forward of the engine and above the CRFM.

* * * * *